(12) United States Patent
Walch

(10) Patent No.: US 6,909,364 B2
(45) Date of Patent: Jun. 21, 2005

(54) COMMERCIAL TRANSPORTATION EARLY WARNING LOW AIR PRESSURE SYSTEM

(76) Inventor: Wayne N Walch, 880 Vista Park Dr., Eagle Point, OR (US) 97524

( * ) Notice: Subject to any disclaimer, the term of this patent is extended or adjusted under 35 U.S.C. 154(b) by 0 days.

(21) Appl. No.: 10/418,550

(22) Filed: Apr. 17, 2003

(65) Prior Publication Data

US 2004/0207531 A1 Oct. 21, 2004

(51) Int. Cl.[7] ................................. B60Q 1/00
(52) U.S. Cl. ....................................... 340/438
(58) Field of Search ................... 340/438, 431, 340/452, 531, 442, 444, 443; 455/90; 439/35

(56) References Cited

U.S. PATENT DOCUMENTS 5,677,667 A * 10/1997 Lesesky et al. ............. 340/431
5,926,087 A * 7/1999 Busch et al. ................ 340/438

* cited by examiner

Primary Examiner—Daryl C Pope

(57) ABSTRACT

An improved Commercial Transportation Early Warning Low Air Pressure System which is used on Commercial vehicles that are operated on or off the road. The system uses materials that are presently manufactured by Original Equipment Manufacturers as well as their Sub Contractors and installed within the Primary Air Pressure System, having sensors, lights, flashers and fittings made from a variety of materials.

1 Claim, 1 Drawing Sheet

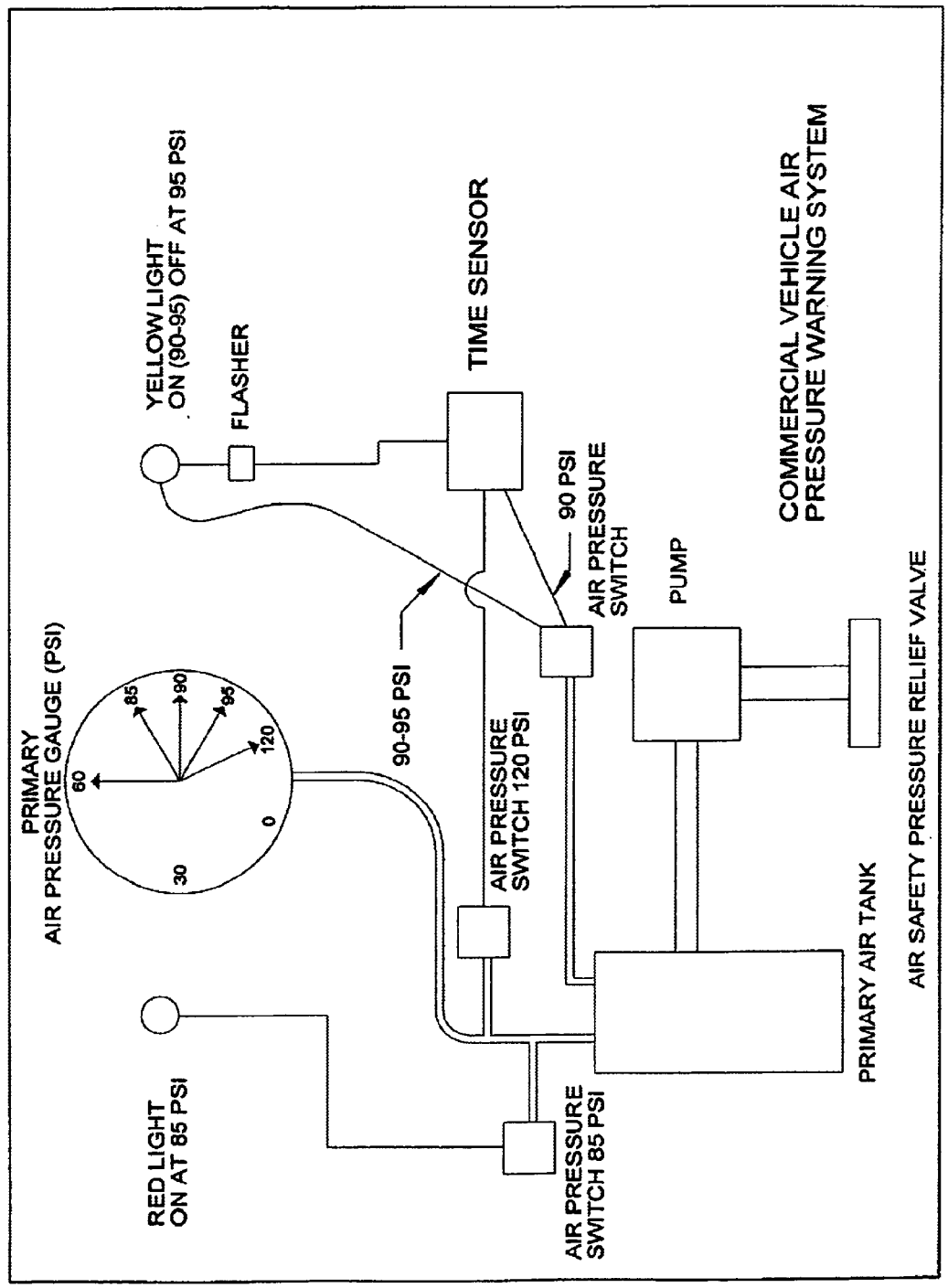

COMMERCIAL TRANSPORTATION EARLY WARNING LOW AIR PRESSURE SYSTEM

BACKGROUND INFORMATION

Field of the Invention

This invention relates to commercial vehicles that are equipped with air brakes, and are operated both over the road and off the road) It relates to a improved warning when the primary air pressure is evacuated at a fast rate.

Background

Air brake systems have a pressure gage that indicates the pressure within the primary air system. A low air-pressure indicator turns on a warning lamp and/or sounds a buzzer when the air pressure drops below a safe minimum pressure for normal operation. When the air pressure is below 60 PSI the brake shoes are activated automatically against the brake drums or discs which then stops the vehicle and prevents the vehicle from moving and/or locks the brakes in place. Presently prescribed by: U.S. DEPARTMENT OF TRANSPORTATION FEDERAL MOTOR CARRIER SAFETY ADMINISTRATION PART 393.51 (c) 1 The vehicle must have a low air pressure warning device that conforms to the requirements of either paragraph (c) (1) (i) or (ii) of this section. "The vehicle must have a device that provides a readily audible or visible continuous warning to the driver whenever the pressure, of the compressed air in the braking system is below a specified pressure, which must be at least one-half of the compressor governor cut out pressure".

BRIEF SUMMARY OF THE INVENTION

A preferred embodiment of the present invention is a low air pressure switch, indicator, and buzzer in conjunction with both a red and yellow lights augmented with a flasher and timer installed in the primary air pressure system. When the air pressure falls to 90–95 the yellow light comes on momentarily to alert the driver the compressor has started to pump. If the driver has not been using the brakes he will know there is a air leak in the primary air system.

BRIEF DESCRIPTION OF THE DRAWINGS

The FIGURE is a schematic showing the association of the components as they are related and connected in the commercial vehicle.

DETAILED DESCRIPTION OF THE PREFERRED EMBODIMENT

If the compressor is taking to long to build above 95 PSI this causes the yellow light to flash on and off and alerts the driver that the air compressor is working in an attempt to reach the specified governed rate (approximate 120 PSI) and could represent a major air loss by not maintaining a safe volume of air. When the air pressure falls to 85 PSI or below the red light turns on and is cause for the operator of the vehicle to stop and address the root cause of the loss of air pressure or availability for the air compressor to reach it governed requirement. It is recognized that other U.S. DOT and FMCSA rules require a red light and audible sound to commence between 0 and one half of the air compressor governor pressure. However the invention system is for early warning and the U.S. DOT FMCSA requirement is to late to avoid the spring brake application. The spring brakes which are activated as follows:

1. By the Low Air Pressure and
2. By the Parking Valve.

The Spring Brake does not have the same operating efficiency as applying the Dual Brake Valve (foot) or Trailer (hand) Valve, therefore will not stop the vehicle's within the prescribed time or distance required by law. This is also described in the same manner when descending down hill, the same principal applies (the lower the air pressure compared to a higher air pressure) takes longer to stop therefore endangers the driver well as others close by.

The Commercial Transportation Early Warning Air Pressure System allows the operator of the vehicle to be in control of the vehicle prior to the spring brake application some place below 60PSI at which time its to late to eliminate the emergency stop, which could impede or stop traffic and result in injury or loss of life.

What is claimed is:

1. A commercial transportation early warning low air pressure system for monitoring an air compressor on vehicle having air brakes, said system consisting of:
    a low air pressure switch;
    an indicator;
    a buzzer; and
    red and yellow lights connected with a flasher and timer, wherein when air pressure in the air brakes falls between 90–95 PSI, the yellow lights are flashed on and off, and when the air pressure falls to 85 PSI, the red light turns on.

* * * * *